(12) United States Patent
Stadermann et al.

(10) Patent No.: US 9,715,625 B2
(45) Date of Patent: Jul. 25, 2017

(54) HIERARCHICAL INFORMATION EXTRACTION USING DOCUMENT SEGMENTATION AND OPTICAL CHARACTER RECOGNITION CORRECTION

(75) Inventors: Jan Stadermann, Rheinbach (DE); Denis Jager, Kerpen (DE); Uri Zernik, Palo Alto, CA (US)

(73) Assignee: Recommind, Inc., San Francisco, CA (US)

( * ) Notice: Subject to any disclaimer, the term of this patent is extended or adjusted under 35 U.S.C. 154(b) by 155 days.

(21) Appl. No.: 13/360,425

(22) Filed: Jan. 27, 2012

(65) Prior Publication Data

US 2013/0198123 A1 Aug. 1, 2013

(51) Int. Cl.
*G06K 9/00* (2006.01)
*G06K 9/72* (2006.01)

(52) U.S. Cl.
CPC ......... *G06K 9/00463* (2013.01); *G06K 9/726* (2013.01); *G06K 2209/01* (2013.01)

(58) Field of Classification Search
CPC .............................. G06N 5/04; G06N 99/005
USPC .......................................................... 706/46
See application file for complete search history.

(56) References Cited

U.S. PATENT DOCUMENTS

| | | | |
|---|---|---|---|
| 5,664,109 A * | 9/1997 | Johnson et al. | 705/2 |
| 6,782,144 B2 * | 8/2004 | Bellavita et al. | 382/310 |
| 7,904,326 B2 | 3/2011 | Gharavy | |
| 7,930,197 B2 | 4/2011 | Ozzie et al. | |
| 8,037,004 B2 | 10/2011 | Rajkumar et al. | |
| 2001/0014852 A1 * | 8/2001 | Tsourikov et al. | 704/9 |
| 2003/0112270 A1 * | 6/2003 | Newell et al. | 345/738 |
| 2005/0067482 A1 * | 3/2005 | Wu et al. | 235/375 |
| 2006/0116866 A1 * | 6/2006 | Suzuki | G06F 17/2872 704/2 |
| 2006/0245641 A1 | 11/2006 | Viola et al. | |
| 2006/0253274 A1 * | 11/2006 | Miller | 704/9 |
| 2009/0110279 A1 * | 4/2009 | Jain et al. | 382/176 |
| 2009/0171931 A1 | 7/2009 | Avitzur et al. | |
| 2011/0258170 A1 | 10/2011 | Duggan et al. | |
| 2011/0268351 A1 * | 11/2011 | Huo | 382/161 |

FOREIGN PATENT DOCUMENTS

| | | |
|---|---|---|
| WO | WO2006002009 | 1/2006 |
| WO | WO2013112260 | 8/2013 |

OTHER PUBLICATIONS

Chao et al., Layout and Content Extraction for PDF Documents, S. Marinai and A. Dengel (Eds.): DAS 2004, LNCS 3163, pp. 213-224, 2004.*

(Continued)

*Primary Examiner* — Lut Wong
*Assistant Examiner* — Robert Bejcek, II
(74) *Attorney, Agent, or Firm* — Carr & Ferrell LLP

(57) ABSTRACT

Systems, methods, and media for extracting and processing entity data included in an electronic document are provided herein. Methods may include executing one or more extractors to extract entity data within an electronic document based upon an extraction model for the document, selecting extracted entity data via one or more experts, each of the experts applying at least one business rule to organize at least a portion of the selected entity data into a desired format, and providing the organized entity data for use by an end user.

12 Claims, 11 Drawing Sheets

(56) References Cited

OTHER PUBLICATIONS

Krallinger and Valencia. Text-mining and information-retrieval services for molecular biology. Genome Biology 2005, 6:224.*
Ishitani. Document Transformation System from Papers to XML Data Based on Pivot XML Document Method. Proceedings of the Seventh International Conference on Document Analysis and Recognition (ICDAR'03) 2003.*
Graham, Ian. Service Oriented Business Rules Management Systems. 2006. 75 pages. Available online at http://trireme.com/Service_Oriented_Business_Rules_Management_Systems.htm.*
International Search Report mailed Mar. 11, 2013 in Patent Cooperation Treaty application No. PCT/US2012/071876, filed Dec. 27, 2012.
International Search Report, Mar. 11, 2013, PCT/US2012/071876, Dec. 27, 2012.
Extended European Search Report mailed Dec. 3, 2015 in European Application No. 12866444.8 filed Dec. 3, 2014.
Agazzi, Oscar et al., "Hidden Markov Model Based Optical Character Recognition in the Presence of Deterministic Transformations," Signal Processing Research Department, AT&T Bell Laboratories, Jul. 12, 1993.

* cited by examiner

200

(iii) *Thresholds.*

205 → (A) *"Independent Amount"* means with respect to Party A: Not Applicable
*"Independent Amount"* means with respect to Party B: Not Applicable 210 → (B) *"Threshold"* means with respect to Party A: Zero
*"Threshold"* means with respect to Party B: Zero 215 → (C) *"Minimum Transfer Amount"* means with respect to Party A: EUR 250,000
*"Minimum Transfer Amount"* means with respect to Party B: EUR 250, 000

220 → provided that if an Event of Default, Potential Event of Default, Termination Event, or Additional Termination Event has occurred and is continuing with respect to a party, then the Minimum Transfer Amount in respect of that party shall be zero.

FIG. 2A

<text>(iii)</text> <text italics="on">Thresholds.</text>

<text>(A)</text>

<text italics="on">"/ndependmt Amount"</text> <text>means with respect to Party A:</text>

<text italics="on">"Independent Amount"</text> <text>means with respect to Party B:</text>

<text>(8)</text>

<text>(C)</text>

230

<text italics="on">"T/zreslwld"</text> <text>means with respect to Party A:</text>

<text italics="on">"Titreshold"</text> <text>means with respect to Party B:</text>

235

<text italics="on">"Jlinimum Transfer Amount"</text> <text>means with respect to Party A:</text>

<text italics="on">"JJinimum Transfer Amount"</text> <text>means with respect to Party B:</text>

<text>Not Applicable Not Applicable</text>

<text>Zero Zero</text>

225

<text>EUR 250,000 EUR250, 000</text>

<text>provided that if an Event of Default, Potential Event of Default, Termination Event, or Additional T 'rrnination Event has occurred and is continuing with respect to a party, then the Minimum Transfer Amount 111 respect of that party shall be zero,</text>

FIG. 2B

HIERARCHICAL INFORMATION EXTRACTION USING DOCUMENT SEGMENTATION AND OPTICAL CHARACTER RECOGNITION CORRECTION

FIELD OF THE TECHNOLOGY

Embodiments of the disclosure relate to systems and methods that extract information from scanned documents having a discernible or known structure.

BACKGROUND OF THE DISCLOSURE

Optical character recognition (OCR) tools may be utilized to recognize and expose recognized characters in a scanned document. Oftentimes OCR technologies can be used to convert a scanned document into a text file or other word processor compatible file formats. While OCR tools are known, automatically extracting entity data (objects) from these scanned documents is often a difficult undertaking, even with documents that utilize a standard layout or format. Additional difficulties may be encountered when scanning processes obscure or blur text within the document, along with OCR character recognition errors, such as when characters are mistakenly or erroneously recognized. For example, when the characters of "r" and "n" exist next to one another they may be mistakenly recognized as "m." Exemplary recognition errors may arise due to font characteristics applied to the characters, as well as other formatting errors.

SUMMARY OF THE DISCLOSURE

According to some embodiments, the present technology may be directed to methods for extracting entity data from electronic documents by (a) executing one or more extractors to extract entity data within an electronic document based upon an extraction model for the document; (b) selecting extracted entity data via one or more experts, each of the experts applying at least one business rule to organize at least a portion of the selected entity data into a desired format; and (c) providing the organized entity data for use by an end user.

According to other embodiments, the present technology may be directed to systems for synthesizing a view of at least a portion of a file system backup. These systems may include: (a) a memory for storing an executable instructions that extract entity data from electronic documents; (b) a processor that executes the instructions; (c) an extraction module that extracts entity data within an electronic document based upon an extraction model for the electronic document; (d) an expert that selects extracted entity data and applies at least one business rule to organize at least a portion of the selected entity data into a desired format; and (e) an output generator that outputs the organized entities.

According to additional embodiments, the present technology may be directed to computer readable storage media for synthesizing a view of at least a portion of a file system backup. The storage media may include a program embodied thereon, the program being executable by a processor to perform a method for extracting entity data from electronic documents by (a) executing one or more extractors to extract entity data within an electronic document based upon an extraction model for the document; (b) selecting extracted entity data via one or more experts, each of the experts applying at least one business rule to organize at least a portion of the selected entity data into a desired format; and (c) providing the organized entity data for use by an end user.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIGS. 2A and 2B illustrates an exemplary scanned section of an OCR processed document and an exemplary output of raw text extraction from the OCR processed document, respectively;

DETAILED DESCRIPTION

Figure 1:
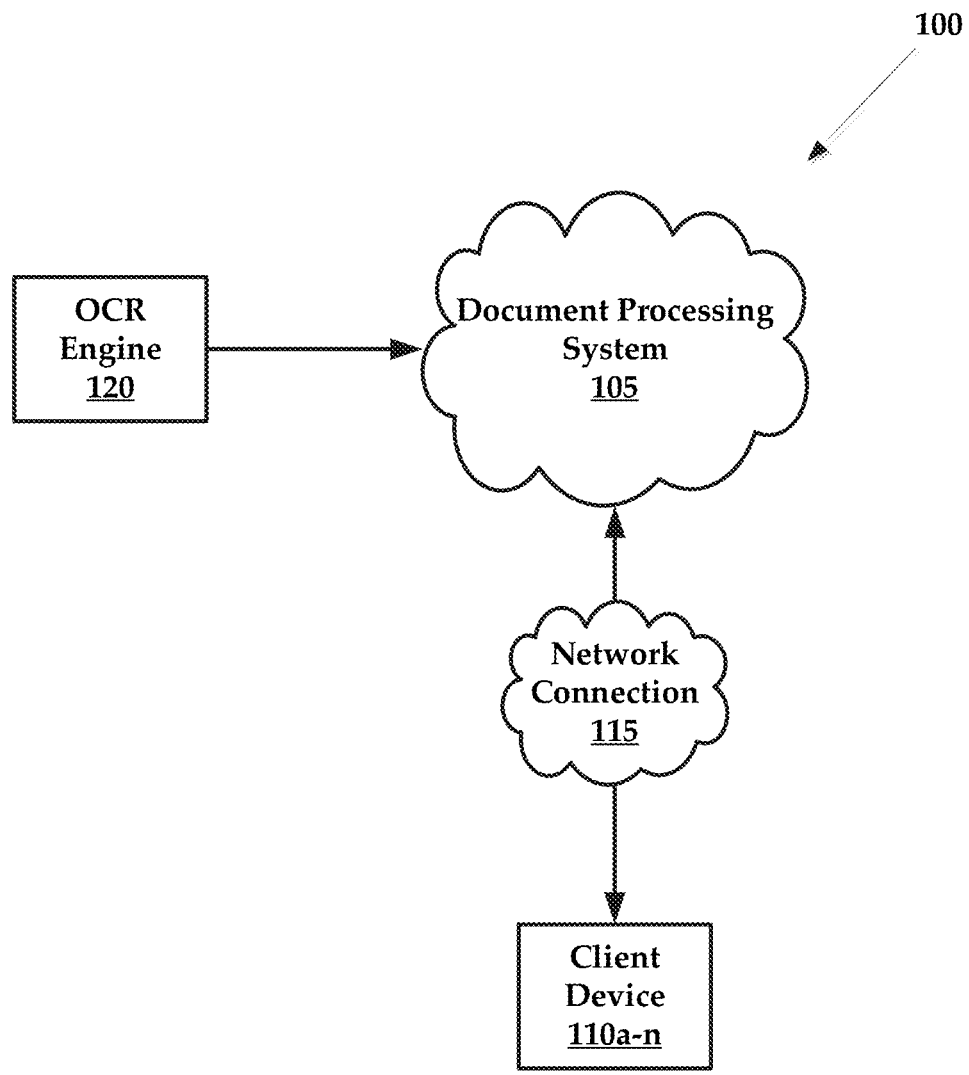
FIG. 1 illustrates an exemplary system for practicing aspects of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Generally speaking, the present technology is directed to hierarchical entity extraction using document segmentation, optical character recognition (OCR) correction, and data extraction. The present technology makes use of automatically extracted entity information and cross-checks between classifiers (experts) to increase the robustness (i.e. precision) of the extracted data. Additionally, the use of data extractors increases the portability of the present technology to new domains (other classes of structured documents) and accommodates for variations in the layout (due to real layout-differences or OCR text misplacements) of the documents.

In other words, systems and methods provided herein utilize data extractors to extract individual entity data from a document and data experts that extract high-level information from the document by applying business rules to data gathered by the data extractors and also to validate the data.

It will be understood that for purposes of brevity, the terms electronic document may be referred to synonymously as a "document." That is, documents processed by the present technology include electronic versions of documents.

The present technology may employ a set of data extractors that extract important pieces of information associated with entity data within scanned or other types of electronic documents. The data extractors may utilize an extraction model for the document, which defines both the entity data that are to be extracted, and a layout or structure of the document that guides the extractors to the correct portions of the document. The structure of the document may include information such as known sections and standard entities included in such sections. Extraction may include a determination of entity data as well as annotation of the data, and may not in all instances include extraction.

The extracted entity data may be further processed by a set of experts (data organization/verification modules) that arrange, assemble, or piece together the extracted entity data according to a desired format. Advantageously, the desired format may be determined by a business rule. Once assembled by the experts, the extracted and arranged entity data may be presented to the user, along with a view of the original document that includes annotations for each entity that was extracted from the document.

The extracted entity may be presented to a reviewer via a user interface and after review the information may be transferred to the customer using an agreed format, such as extensible markup language (XML).

In sum, the present technology leverages dynamic data-extractors that can be reused to extract and evaluate various pieces of higher-level information within an electronic document. Additionally, the present technology can be adapted to new domains or extended very easily by adding/changing a specific set of extractors. The present technology may also compensate for local OCR distortions that appear in the specific piece of information (e.g. presenting a "S" for the digit "5").

FIG. 1 illustrates an exemplary system for practicing aspects of the present technology. The system 100 may include a document processing system 105 that may include one or more web servers, along with digital storage media device such as databases. The document processing system 105 may also function as a cloud-based computing environment that is configured to process electronic documents in accordance with various embodiments of the present technology. Details regarding the operation of document processing system 105 will be discussed in greater detail with regard to FIG. 3.

In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

A plurality of client devices 110a-n may communicatively couple with the document processing system 105 via a network connection 115. The network connection 115 may include any one of a number of private and public communications mediums such as the Internet. The client devices 110a-n may be required to authenticate themselves with the document processing system 105 via credentials such as a username/password combination, or any other authentication means that would be known to one of ordinary skill the art with the present disclosure before them.

According to some embodiments, an OCR engine 120 may transmit or upload OCR processed electronic documents to the document processing system 105 for entity data extraction and subsequent processing.

As background, the electronic documents that are processed by the present technology may include scanned versions of hardcopy documents or electronic versions of documents that are stored in any number of electronic file formats such as portable document format (PDF), image file formats such as tagged image file format (TIFF), and so forth. The electronic documents may have been processed using optical character recognition (OCR) technologies, to extract characters and words from the electronic document in their original file format. Oftentimes, scanning processes, file conversion errors, compression, and/or font related errors may lead to blurring of text within an electronic document. Blurred text within an electronic document may create erroneous output when OCR technologies are applied to the electronic document. That is, the correct text included in the document may be extracted by the OCR technologies such that the OCR output does not correspond to the correct text. As will be discussed in greater detail below, the present technology may utilize statistical analyses to disambiguate erroneously extracted OCR output to ensure that only correctly translated content is utilized.

An exemplary scanned section of an OCR document is shown in FIG. 2A, along with the corresponding textual information obtained from each subsection, in FIG. 2B. The scanned segment 200 of FIG. 2A includes a "threshold" section of a contract. The threshold section includes a plurality of different subsections such as "independent amount 205," "threshold 210," and "minimum transfer amount 215." The scanned segment 200 also includes a distorted section 220 that includes textual information that was blurred during the scanning process. While such textual information is not difficult to interpret for human readers, such is not the case for automatic text extraction systems.

During OCR character extraction, each of the above-describe sections of the scanned document 200 is properly extracted except the distorted section 220. FIG. 2B illustrates captured text section 225 that includes textual information captured from OCR processing of distorted section 220. For example, the OCR processing of distorted section 220 produces the following output:

<text> provided that if an Event of Default, Potential Event of Default, Termination Event, or Additional T'rmination Event has occurred and is continuing with respect to a party, then the Minimum Transfer Amount 111 respect of that party shall be zero,</text>

As can be seen, the OCR processing of distorted section 220 has mistakenly processed the word "Termination" as "T'rrnination." Accommodations for these types of distortions will be discussed in greater detail infra.

Additionally, the OCR processing of text section 210 produces output 230 that includes the following error:

---

<text italics="on">"T/zreslwld"</text> <text>means with respect to Party A:</text>

---

The word "Threshold" has been recognized by the OCR processor and generated as output 230 that includes "T/zreslwld," which may have been caused by the word being italicized.

Similarly, the OCR processing of text section 215 produces the output 235 that includes the following error:

<text italics="on">"Jlinimum Transfer Amount"</text>

The word "Minimum" has been recognized by the OCR processor and generated as output 235 that includes "Jlinimum," which again, may have been caused by the word being italicized or inconsistencies with the color contrast of the characters.

Initially, the client devices 110*a-n* or the OCR engine 120 may upload electronic documents (in some embodiments, OCR processed documents) to the document processing system 105. Once uploaded, the electronic documents may be processed by the document processing system 105 via execution of a document processing application 300, which is described in greater detail below with reference to FIG. 3.

Figure 3:
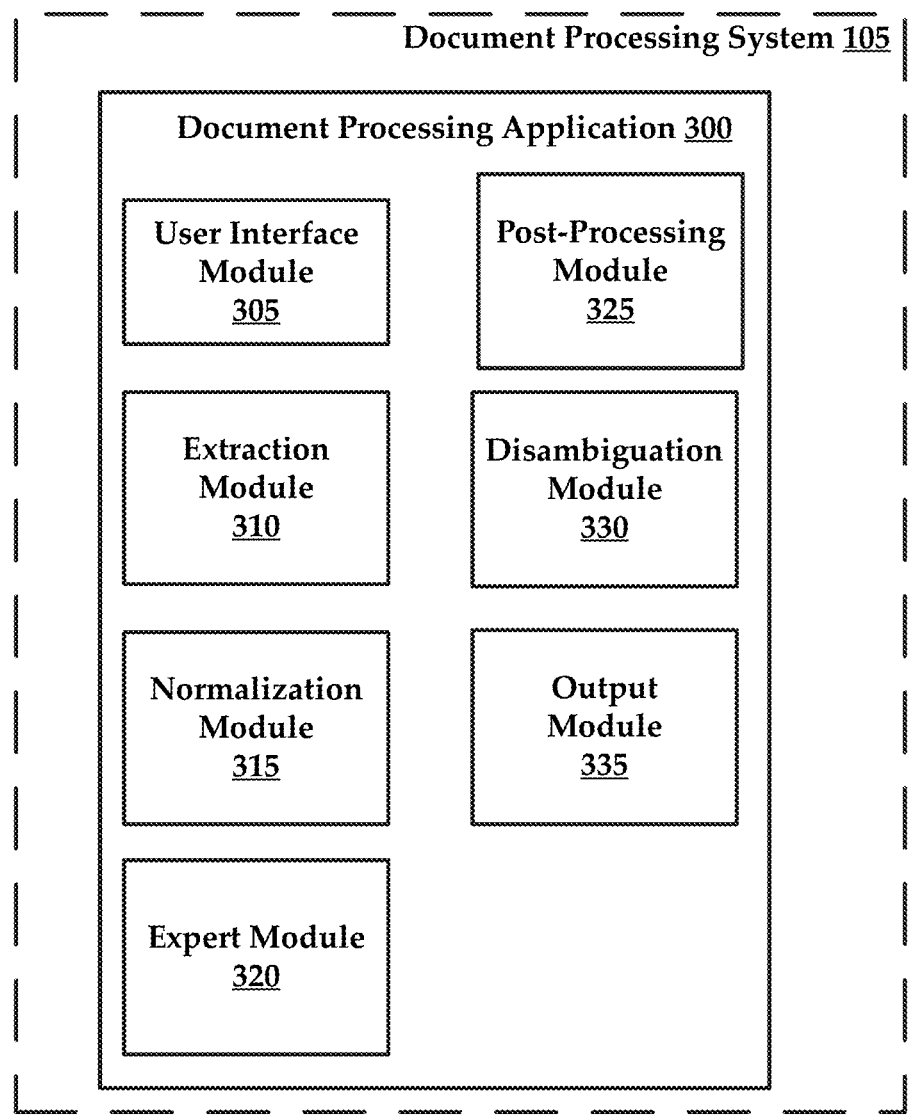
FIG. 3 shows a schematic diagram of an exemplary document processing application.

FIG. 3 illustrates a block diagram of an exemplary document processing application, hereinafter application 300, which is constructed in accordance with the present disclosure. Generally speaking, the application 300 may execute one or more extractors to extract entity data within an electronic document based upon an extraction model for the document, select extracted entity data via one or more experts, wherein each of the experts applying at least one business rule to organize at least a portion of the selected entity data into a desired format, and also provide the organized entity data for use by an end user.

The application 300 may comprise a plurality of modules such as a user interface module 305, an extraction module 310, a normalization module 315, an expert module 320, a post-processing module 325, a disambiguation module 330, and an output module 335. It is noteworthy that the application 300 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the application 300 may include separately configured web servers.

The client nodes may interact with the application 300 via one or more graphical user interfaces that are generated by the user interface module 305. The graphical user interfaces may provide any number of mechanisms that allow the end user to upload electronic documents, specify the type of data that is to be extracted from the uploaded documents, their desired output format (e.g., a user interface or an XML document), along with any other type of instructional information that will be used by the present technology to process the uploaded electronic documents.

Once an electronic document has been uploaded into the document processing system, the extraction module 310 may execute a plurality of extractors to extract entity data from the electronic document.

Again, an extraction model may be specified that guides the extractors in extracting entity data from the electronic document. In some embodiments, the "extraction" of entity data may include annotating or otherwise identifying entity data for subsequent processing. Also, each extractor may utilize a library that includes a fixed or dynamic set of entities, or of regular expressions, such as expressions commonly utilized in the document layout. As stated above, the extraction model may be generated from a basic structural template or layout for a particular type of document. For example, the document may include a standardized contractual document (e.g., layout) that complies with the International Swaps and Derivatives Association (ISDA) master agreement format, although one of ordinary skill in the art will appreciate that other document formats may likewise be utilized in accordance with the present technology. The extraction model may utilize the layout for the document to predictively determine the sections that should be included in the document, potentially the hierarchical arrangement of the sections within the document, and/or individual entity types that should be present within a section.

According to some embodiments, the extraction module 310 may execute individual extractors that examine the OCR processed text of the document and extract individual entity data from within the document. An extractor may be executed to obtain a number, a currency phrase, a keyword, or any other definable content. By way of non-limiting example, an extractor may extract an entity information such as "minimum transfer amount" (see output 235 of FIG. 2) which includes an extracted value of "EUR250,000."

Once entity data has been extracted by one or more extractors, utilizing the extraction model, the values associated with the extracted entity data may be normalized by the normalization module 315. The normalization module 315 may convert or normalize extracted entity data, for example, by converting a number value into an agreed format or converting a currency value into an international organization for standardization (ISO) format. The types of normalization that may be applied to an extracted entity may depend upon any standard, conversion methodology, and/or schema chosen by the end user.

Figure 4:
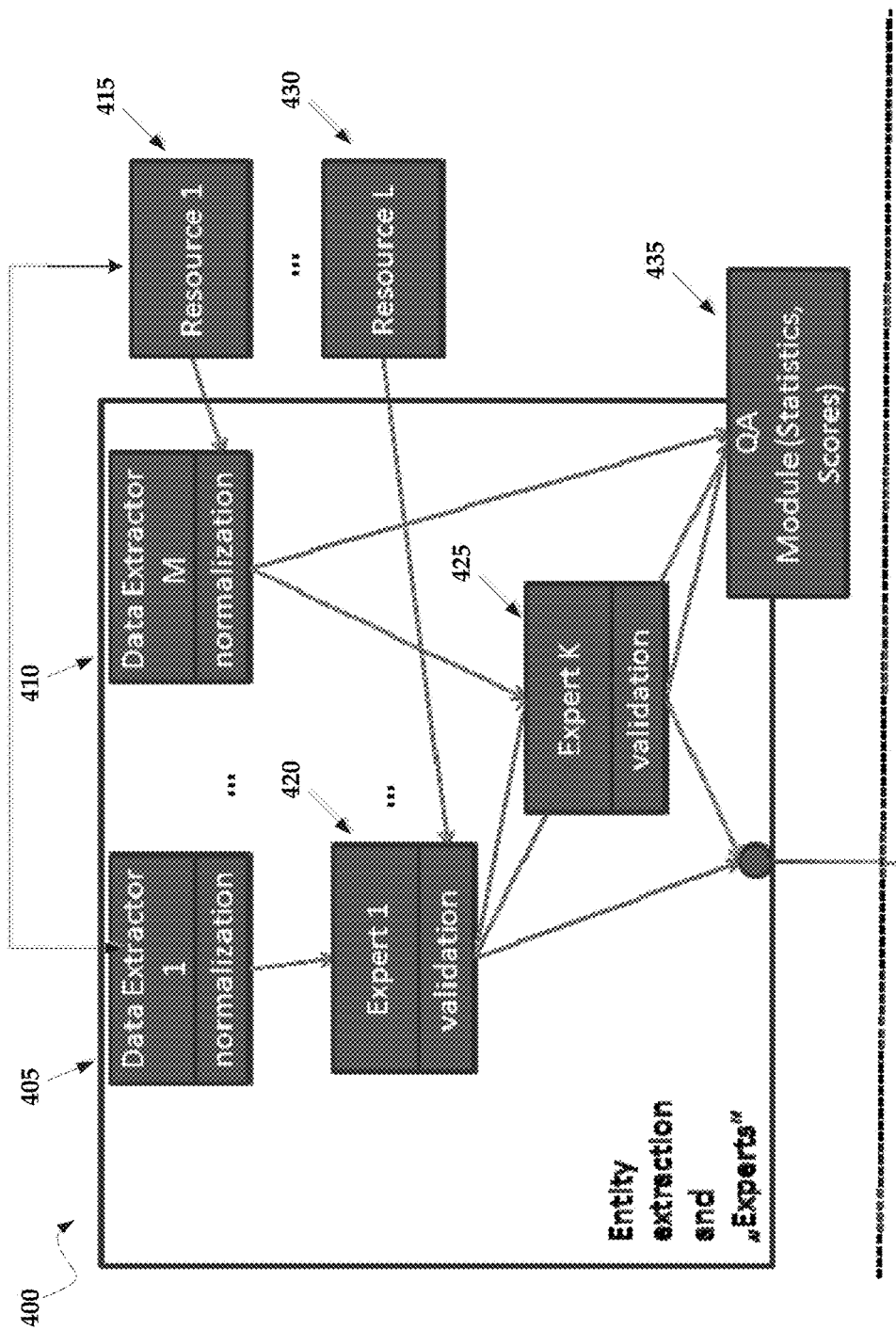
FIG. 4 is a block diagram of an exemplary entity extraction and expert process.

Regardless of whether the normalization module 315 processes entity data extracted by an individual extractor or a plurality of extractors, the normalization module 315 may receive normalization or conversion formats from one or more resources, as shown in FIG. 4. The resources may include standardized data formats that may be utilized by the normalization module to convert an entity into an accepted data format. For example, the extracted entity data of "EUR250,000" may be converted by the normalization module 315 to a format such as "250.000€."

After extraction and/or normalization (if necessary), the expert module 320 may execute experts that further process the extracted entity data obtained by the extractors. The experts apply business rules to the extracted entity data to arrange or organize the extracted entity data. In some embodiments, the experts extract high-level information from an electronic document.

According to some embodiments, a business rule may define the type of information that a particular end user desires to obtain from an electronic document. For example, the end user may only be interested in harvesting payment terms from a contract and the relative obligations of the parties regarding the payment terms. As such, one or more experts may be executed to organize both party specific and payment specific entity data into a format that is acceptable to the end user.

In some embodiments, a business rule (guidelines for assembling extracted entity data points) may be defined using a set of slots. It will be understood that each slot may include one or more properties that define conditions when the slot is allowed to be filled. In some instances, when all, or a predetermined number of slots has been filled, the expert may verify or validate the entity data. An exemplary application of a business rule to assemble extracted entity data is shown with regard to FIGS. 5-7.

FIG. 4 illustrates a block diagram of an exemplary entity extraction and expert process. The process 400 includes the execution of two extractors such as "Data Extractor 1" 405 and "Data Extractor M" 410. Data Extractor 1 405 is shown as cooperating with a "Resource 1" 415 to obtain normalization information that may be utilized by the extraction module 310 or the normalization module 315 to normalize entity data extracted by the Data Extractor 1 405.

After extraction of entity data, the expert module 320 may execute a plurality of experts such as "Expert 1" 420 and "Expert K" 425. Once the Expert 1 420 has applied a business rule to assemble extracted entity data into a desired format, the Expert 1 420 may cooperate with "Resource L" 430 to obtain validating information that may be utilized to confirm the accuracy of the assembled data.

In some instances, an expert such as Expert K 425 may incorporate assembled and/or verified entity data in a subsequent processing of additional entity data. In this example, the Expert K 425 may request assembled and verified entity data from the Expert 1 420.

After processing by the experts, the assembled and/or verified entity data may be output by an output module 335 in any format desired, such as output to an XML file or a user interface. In other embodiments, the assembled and/or verified entity data may be directed to a post-processing module 325, such as the QA Module 435, where statistical analyses or accuracy scores may be generated for the entity data.

Figure 5:
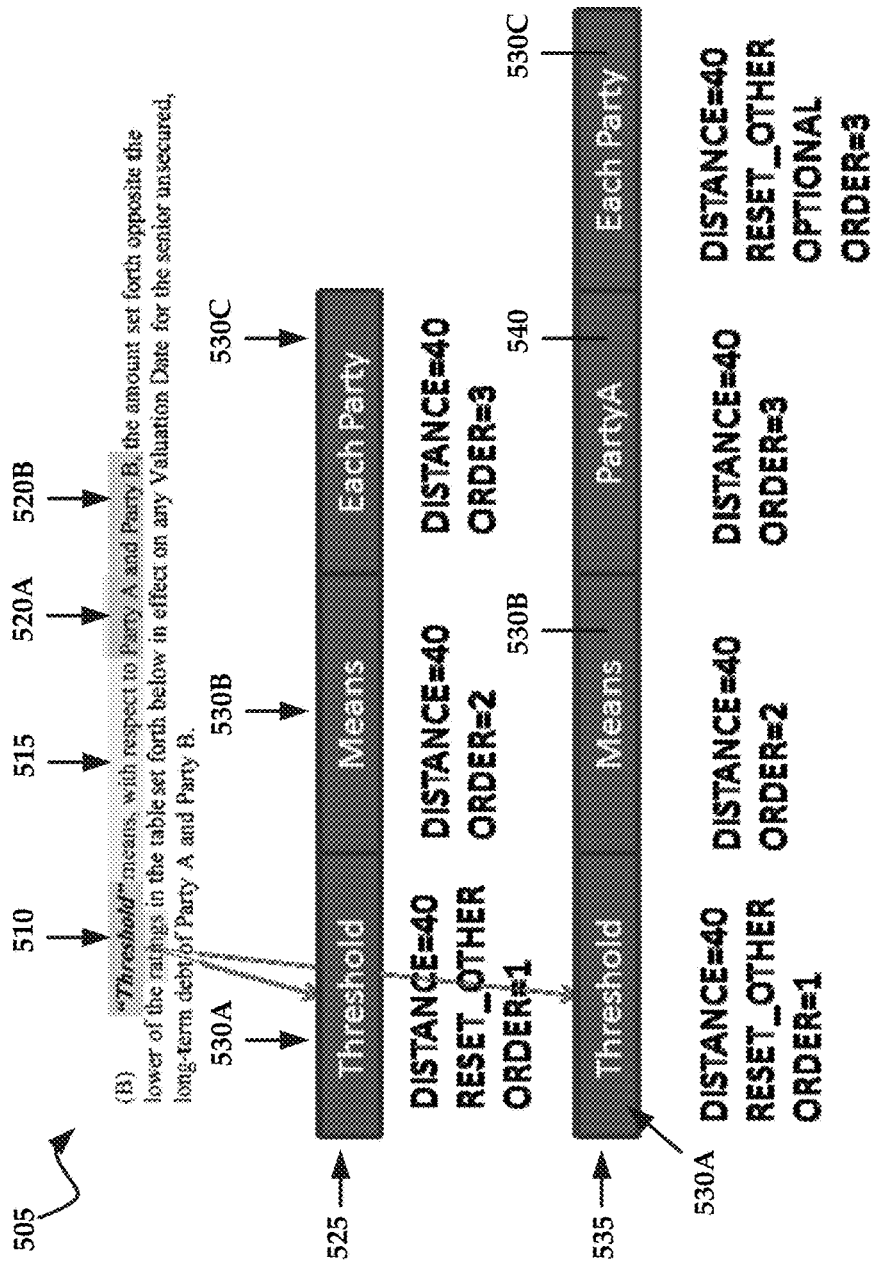
FIGS. 5-7 are diagrammatical views of an exemplary application of one or more business rules to extracted entity data.
Figure 6:
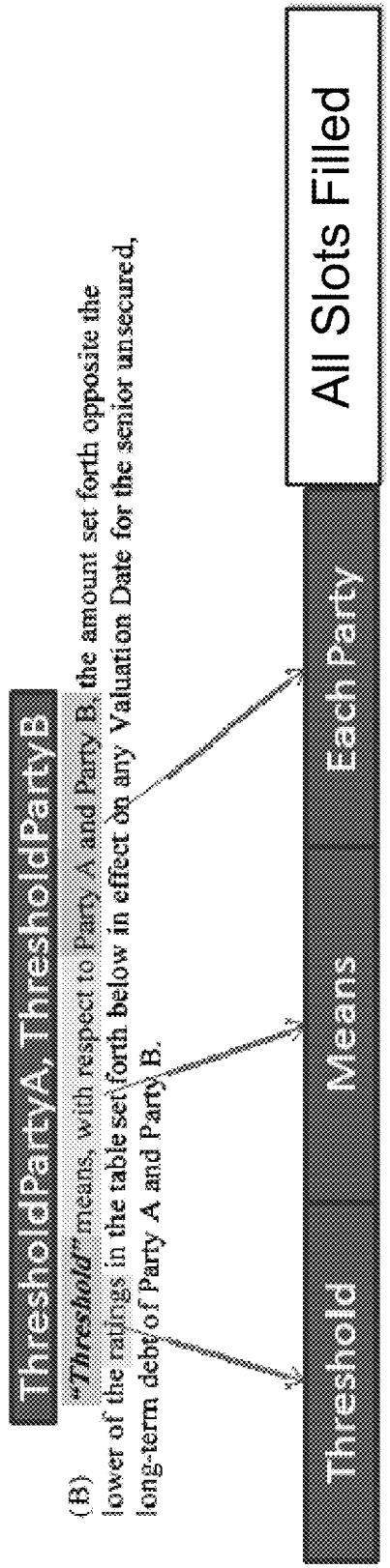
Figure 7:
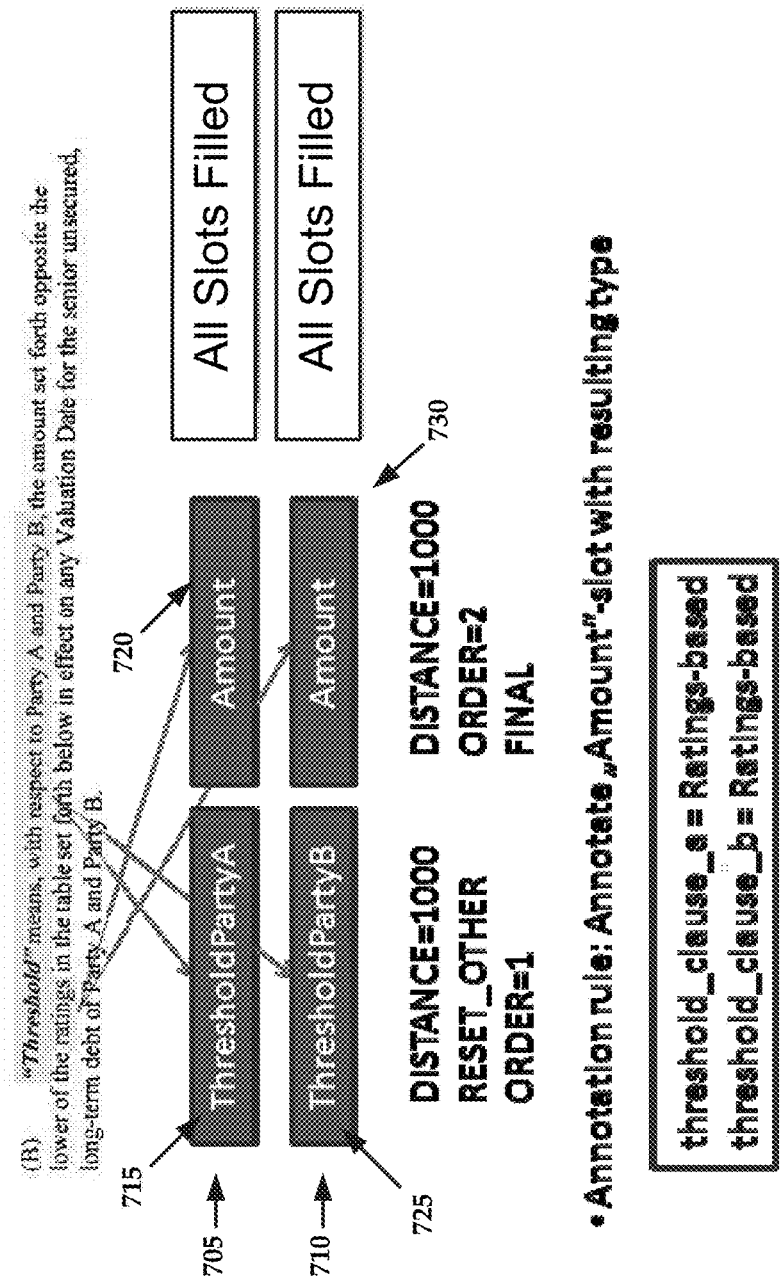

FIGS. 5-7 are diagrammatical views of an exemplary application of one or more business rules to extracted entity data. FIG. 5 includes a section 505 of text from the electronic document that includes an extracted entity 510 of "Threshold," an extracted entity 515 of "means with respect to," an extracted entity 520A of "Party A," and an extracted entity 520B of "Party B." Extraction in the example includes annotation of the entity data via highlighting.

An expert may apply a business rule that determines a threshold definition relative to each party. The business rule is applied to the section using a set 525 that includes three slots 530A, 530B, and 530C. Slot 530A of "Threshold" matches with the extracted entity 510 of "Threshold." Slot 530B is descriptive of the defining term "Means," which specifies the definition of the "Threshold" entity for the section 505. Slot 530C is descriptive of "Each party" within the section 505. It is noteworthy to mention that each slot may include one or more properties that determine how the slot is to be filled. For example, the "Threshold" slot 530A includes the properties of "DISTANCE=40," "RESET_OTHER," AND "ORDER=1." The "DISTANCE=40" property will fill the slot with the extracted entity data if the extracted entity data is within a given distance "40" to extracted entity data from already filled slots of the set. It will be understood that the distance may be measured in characters. If the extracted entity data is not within the specified distance property, the slot is cleared. The "RESET_OTHER" property specifies that if the current slot is filled, all other slots will be cleared. Finally, the "ORDER=1" property specifies that this slot may only be filled if slots with a lower number (if any) are filled and slots with a higher number are not filled.

Each slot may have a different permutation of properties that are based upon the business rule applied. Other properties may include, but are not limited to: "FINAL" that specifies that a slot is only to be filled once and additional occurrences of the same extracted entity data are to be ignored; "NON-FINAL" allows the slot to be overwritten; "GROUP=[group identifier]" specifies that all slots within one group are treated as "filled" if at least one slot of the group is filled; "NOT_OVERLAPPING" requires that the extracted entity value of a slot does not overlap with other slots of the same set; "OPTIONAL" specifies that a slot is optional and may be counted as a "filled slot."

Another set 535 is shown as having the same slots as set 525, but with an additional slot 540 that includes a slot specifically for PartyA.

FIG. 6 illustrates exemplary output generated by an expert. In this illustration, the whole marked phrase (e.g., section 505 of FIG. 5) is the extracted entity data and an annotation is made over the whole span as defined by the expert. That is, the expert defines that a threshold definition for each party, such as PartyA and PartyB.

FIG. 7 illustrates the subsequent use of assembled entity data that was generated by an expert. This assembled entity data may be utilized by another expert and combined with other extracted entity data. For example, using the ThresholdPartyA and ThresholdPartyB entity data assembled by a first expert, a subsequent expert may combine these entity data points with another data point such as "Amount."

In this example, two sets 705 and 710 each include two slots. For example, first set 705 includes a slot 715 which includes previously assembled entity data ThresholdPartyA along with a slot 720 which includes an "Amount" entity data extracted from the section. The second set 710 also includes two slots, slot 725 and slot 730, similarly to the first set 705 with the exception that the second set 710 utilizes the ThresholdPartyB entity data. Two outputs are generated by this expert. The first output includes "threshold_clause_a=Ratings-based" and the second output includes "threshold_clause_b=Ratings-based."

In some embodiments, the present technology may be utilized to generate table experts that produce special annotations to identify table cells, rather than text that appears in the body of a document. The same hierarchical structure as utilized above may be applied to Table Experts. That is, table cells are comprised of extracted data. Additionally, a table row may be comprised of cells and a table may be comprised of individual table rows.

Referring back to FIG. 3, the present technology may utilize processes and methods that reduce the extraction on errant data included in an electronic document. These processes may also be utilized to simplify the extraction rules utilized by the extractors and the experts.

In some instances the disambiguation module 330 may prevent the extractors and experts from utilizing distorted content contained in the document. The disambiguation module 330 may utilize hidden markov model based segmentation using the aforementioned document layout of the document. Generally speaking, these segmentation processes may identify paragraphs and sub-sections which are known to exist in the document, but are distorted during scanning or other document processes.

The segmentation process may include representing segments of the document by a first-order hidden markov model. For each level or section of the document, a separate model may be utilized. Each state within the model may represent a certain character with one additional state that covers all characters that are not of interest. This model may be applied to a target document using a Viterbi algorithm or any other algorithm that determines the most likely hidden states for a section with distorted text. The application of the Viterbi algorithm allows for alignment of sections to character in the electronic document. Next, the extractors and experts can be configured to process only certain sections of the document.

Figure 8A:
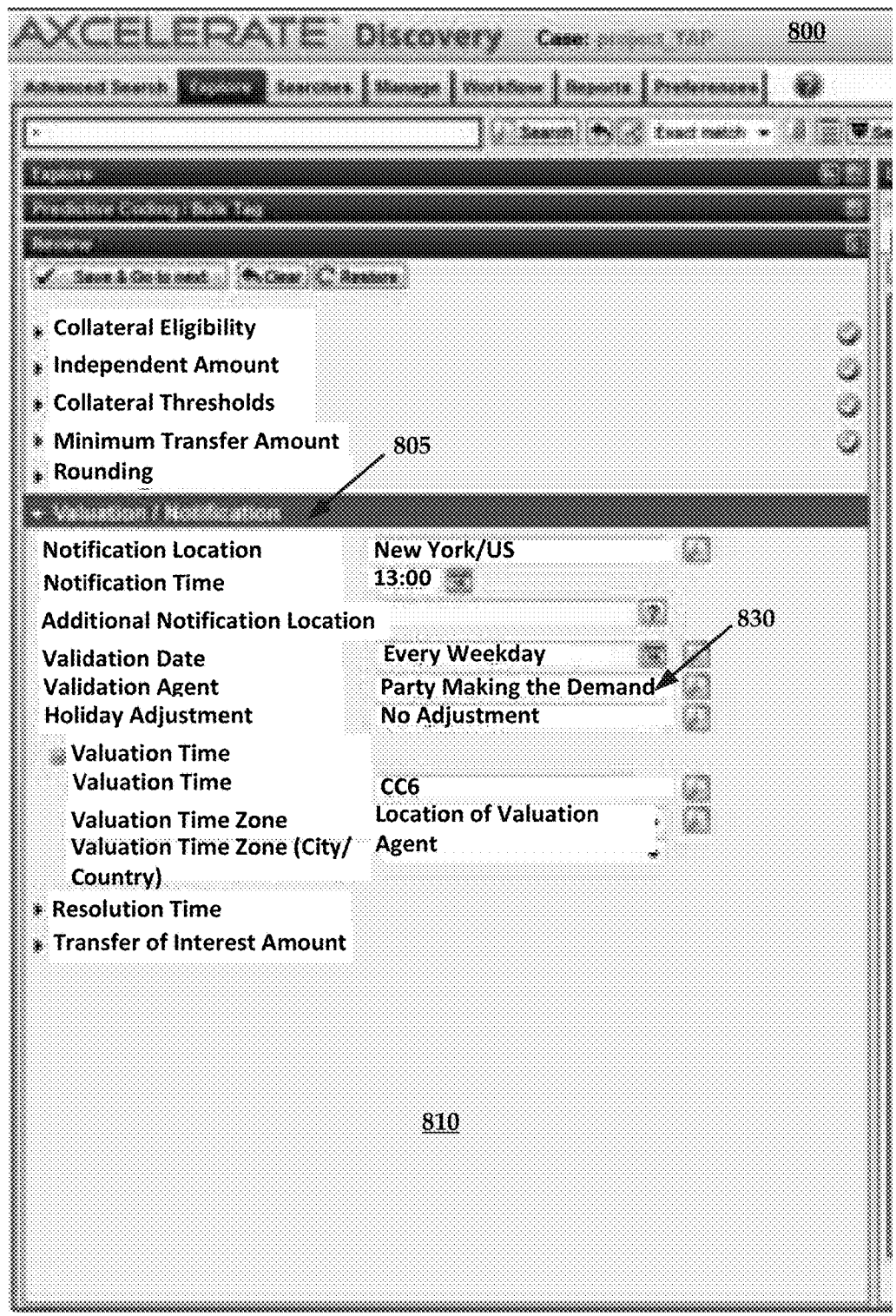
FIGS. 8A and 8B collectively illustrate an exemplary graphical user interface that includes extracted entity information that is used to populate a form, along with an annotated view of the electronic document.
Figure 8B:
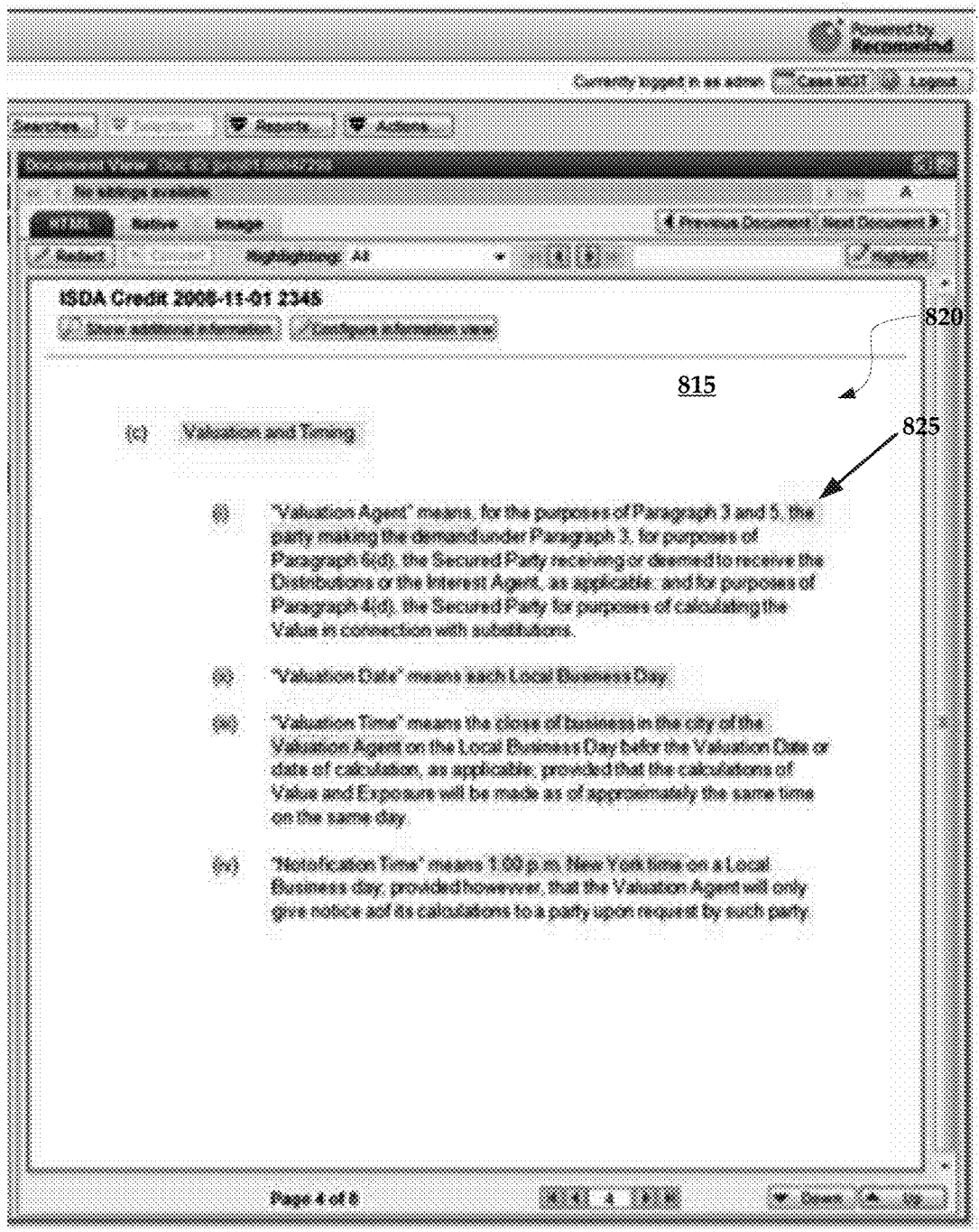

FIGS. 8A and 8B collectively illustrate an exemplary user interface 800 that includes assembled entity data that has been extracted and utilized to populate a form 805 within a frame 810 of the user interface 800. A view 815 of the original document is shown in frame 820. The view 815 includes annotations (extractions of entity data by extractors) of the entity data that is included in the form 805. For example, an entity of "party making the demand" entity 825 is highlighted in the view, as well as populating a field 830 within the form 805. Other entity data may likewise be directly extracted or inferentially determined by an expert and used to populate one or more fields of the form 805.

Figure 9:
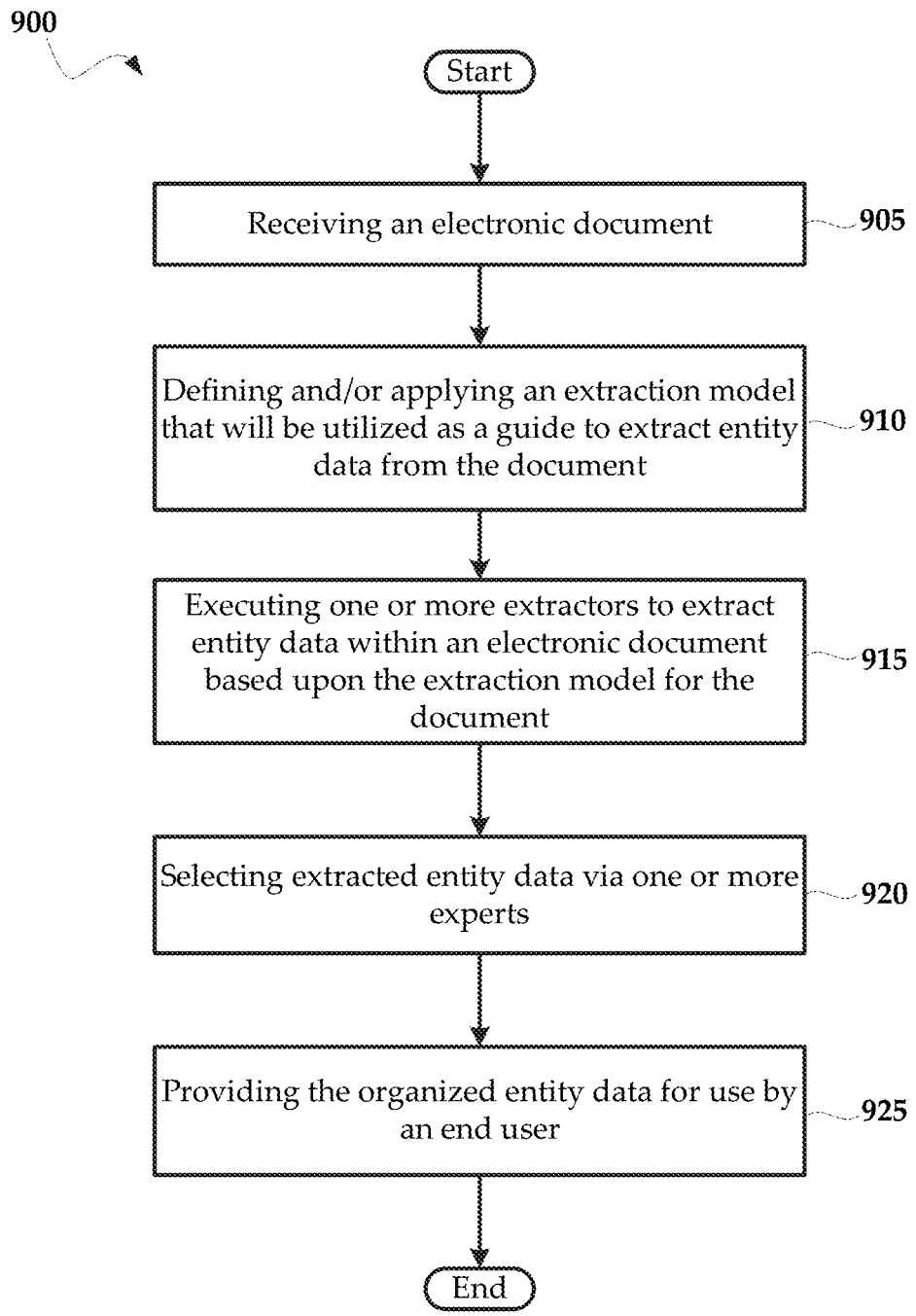
FIG. 9 is a flowchart of an exemplary method for extracted entity data from an electronic document.

FIG. 9 is a flowchart of an exemplary method 900 for extracting entity data from electronic documents. The method may include a step 905 of receiving an electronic document. It will be understood that the electronic document may include a document that has been scanned and processed via OCR technologies to determine characters and text included in the document.

The method may also include a step 910 of defining and/or applying an extraction model that will be utilized as a guide to extract entity data from the document. The extraction model may be based upon a standard template or format to which the document adheres.

The method may include a step 915 of executing one or more extractors to extract entity data within an electronic document based upon the extraction model for the document.

Next, the method may include a step 920 of selecting extracted entity data via one or more experts. It is noteworthy that each of the experts may apply at least one business rule to organize at least a portion of the selected entity data into a desired format.

After assembling or organizing the entity data, the method may include a step 925 of providing the organized entity data for use by an end user.

Step 925 may include storing the assembled entity data in an XML file, or displaying the assembled entity data in a user interface, along with a view of the file that has been annotated with the extracted entity data.

Figure 10:
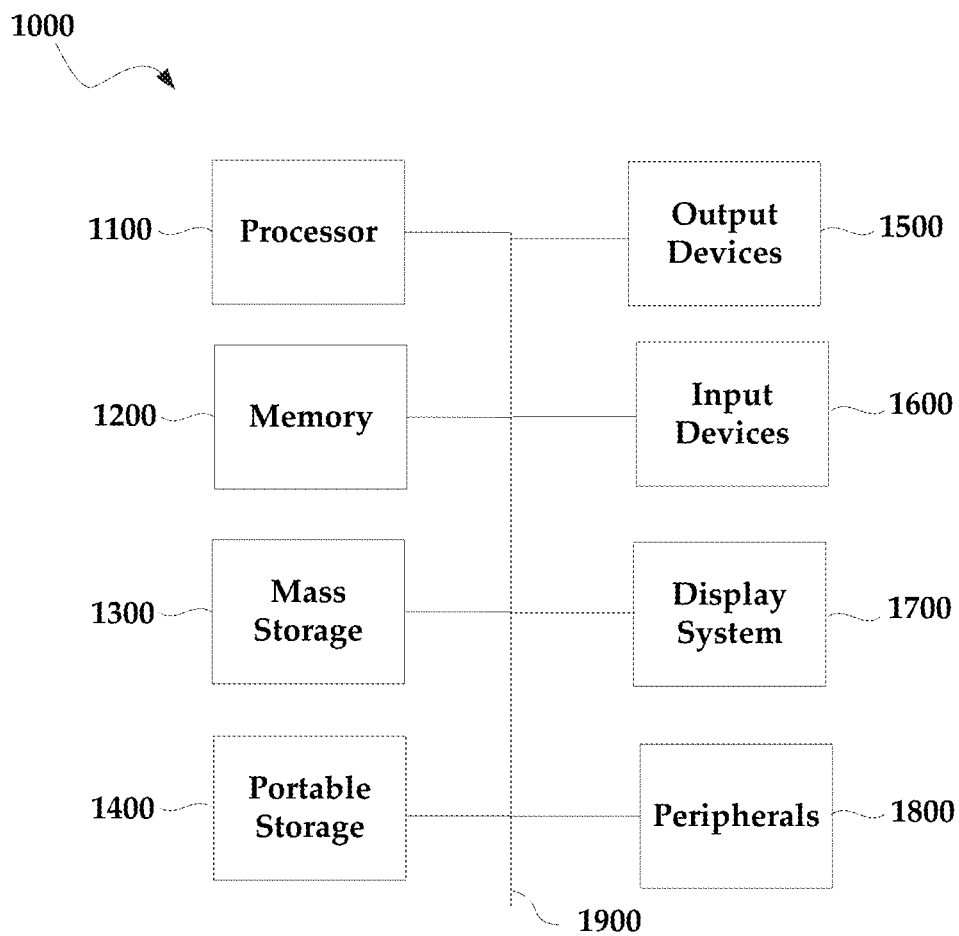
FIG. 10 illustrates an exemplary computing system that may be used to implement embodiments according to the present technology.

The computing system 1000 of FIG. 10 may be implemented in the contexts of the likes of computing systems, networks, servers, or combinations thereof. The computing system 1000 of FIG. 10 includes one or more processors 1100 and main memory 1200. Main memory 1200 stores, in part, instructions and data for execution by processor 1100. Main memory 1200 may store the executable code when in operation. The system 1000 of FIG. 10 further includes a mass storage device 1300, portable storage medium drive(s) 1400, output devices 1500, user input devices 1600, a graphics display 1700, and peripheral devices 1800.

The components shown in FIG. 10 are depicted as being connected via a single bus 1900. The components may be connected through one or more data transport means. Processor unit 1100 and main memory 1200 may be connected via a local microprocessor bus, and the mass storage device 1300, peripheral device(s) 1800, portable storage device 1400, and display system 1700 may be connected via one or more input/output (I/O) buses.

Mass storage device 1300, which may be implemented with a magnetic disk drive or an optical disk drive, is a non-volatile storage device for storing data and instructions for use by processor unit 1100. Mass storage device 1300 may store the system software for implementing embodiments of the present technology for purposes of loading that software into main memory 1200.

Portable storage device 1400 operates in conjunction with a portable non-volatile storage medium, such as a floppy disk, compact disk, digital video disc, or USB storage device, to input and output data and code to and from the computing system 1000 of FIG. 10. The system software for implementing embodiments of the present technology may be stored on such a portable medium and input to the computing system 1000 via the portable storage device 1400.

Input devices 1600 provide a portion of a user interface. Input devices 1600 may include an alphanumeric keypad, such as a keyboard, for inputting alpha-numeric and other information, or a pointing device, such as a mouse, a trackball, stylus, or cursor direction keys. Additionally, the system 1000 as shown in FIG. 10 includes output devices 1500. Suitable output devices include speakers, printers, network interfaces, and monitors.

Display system 1700 may include a liquid crystal display (LCD) or other suitable display device. Display system 1700 receives textual and graphical information, and processes the information for output to the display device.

Peripherals 1800 may include any type of computer support device to add additional functionality to the computing system. Peripheral device(s) 1800 may include a modem or a router.

The components provided in the computing system 1000 of FIG. 10 are those typically found in computing systems that may be suitable for use with embodiments of the present technology and are intended to represent a broad category of such computer components that are well known in the art. Thus, the computing system 1000 of FIG. 10 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix™, Linux™, Windows™, Macintosh OS™, Palm OS™, Android™, iPhone OS™ and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system for providing extracting entity data from electronic documents, the system comprising:
    a memory for storing executable instructions that extract entity data from electronic documents;
    a processor that executes the instructions;
    an extraction module that extracts entity data within an electronic document based upon an extraction model for the electronic document, the electronic document is a scanned version of a hardcopy document, the electronic document having been scanned using optical character recognition;
    a first expert that:
        applies at least one business rule to organize at least a portion of the selected entity data into a desired format, wherein the at least one business rule comprises a set of slots that comprise properties that define conditions for filling the set of slots with table cell data that includes the extracted entity data; and
        assembles a first portion of the selected entity data into a first desired format and fills a portion of the set of slots with the first portion of the selected entity data;
    a second expert that:
        applies at least one other business rule to organize at least a portion of the selected entity data into a desired format; and
        combines the first portion of the selected entity data generated by the first expert with a second portion of the selected entity data using a second desired format and fills another portion of the set of slots with the second portion of the selected entity data; and
    an output generator that outputs a marked phrase from the organized entity data.

2. The system according to claim 1, wherein the output generator organizes the entity data into an extensible markup language file.

3. The system according to claim 1, wherein the output generator generates a user interface that includes the organized entity data and a view of the electronic document that includes an annotation for each of the extracted entity data.

4. The system according to claim 1, wherein a layout defines a target section and one or more target entity data included in the target section that are to be extracted by one or more extractors.

5. The system according to claim 1, wherein the at least one business rule comprises another set of slots, wherein each slot comprises a property that defines a condition for filling the slot via the first expert or the second expert.

6. The system according to claim 5, wherein an expert fills a slot with extracted entity data when the extracted entity data matches the property for the slot.

7. The system according to claim 6, wherein an expert validates the slot when the slots of the set of slots are filled with extracted entity data.

8. The system according to claim 7, wherein an expert generates a combined set of slots that includes a validated set of slots and one or more additional slots which are to be filled.

9. The system according to claim 1, further comprising a disambiguation module that prevents extraction of entity data from a section of the electronic document having distorted content by:
    generating a first-order hidden markov model for each section of the electronic document, based upon a layout of the electronic document;
    applying the first-order hidden markov model to a section of the electronic document that includes distorted text to determine the most likely hidden states for the section;
    aligning the section with characters extracted from the section of the electronic document; and
    configuring one or more extractors and one or more experts to ignore at least a portion of the electronic document determined to include distorted content, based upon the alignment.

10. A non-transitory computer readable storage media having a program embodied thereon, the program being executable by a processor to perform a method for extracting entity data from electronic documents, the method comprising:
    executing one or more extractors to extract entity data within an electronic document based upon an extraction model for the electronic document, the electronic document having been processed using optical character recognition, wherein the one or more extractors are configured to predictively determine sections for the electronic document and a hierarchical arrangement of the sections;
    normalizing the extracted entity data by applying a normalization scheme to the extracted entity data, the normalization scheme converting the extracted entity data into a standardized format;
    executing table experts that produce special annotations that identify table cells for the electronic document which include the extracted and normalized entity data;
    the table experts applying business rules to organize the selected entity data into a desired format, the business rules comprising a set of slots which are to be filled with extracted entity data by the table experts, wherein:
        a first table expert of the table experts assembles a first portion of the selected entity data into a first desired format and fills a portion of the set of slots with the first portion of the selected entity data; and
        a second table expert of the table experts combines the first portion of the selected entity data generated by the first table expert with a second portion of the selected entity data using a second desired format and fills another portion of the set of slots with the second portion of the selected entity data; and
    providing the organized and normalized entity data for use by an end user.

11. The method according to claim 10, wherein the electronic document is a scanned version of a hardcopy document.

12. The method according to claim 10, wherein the electronic document is stored in a format that includes a portable document format or an image file format.

\* \* \* \* \*